US007134573B2

(12) United States Patent
Post

(10) Patent No.: US 7,134,573 B2
(45) **Date of Patent: *Nov. 14, 2006**

(54) APPARATUS FOR DISPENSING A PLURALITY OF POWDERS AND METHOD OF COMPOUNDING SUBSTANCES

(75) Inventor: Jan H. N. Post, Sassenheim (NL)

(73) Assignee: Fluid Management, Inc., Wheeling, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/841,275

(22) Filed: May 7, 2004

(65) Prior Publication Data

US 2005/0247730 A1 Nov. 10, 2005

(51) Int. Cl.
*G01G 13/00* (2006.01)
*B67D 5/48* (2006.01)

(52) U.S. Cl. ............................ 222/1; 222/77; 222/144; 222/278; 222/281; 222/310; 222/333; 222/413

(58) Field of Classification Search .................... 222/1, 222/77, 144, 265, 278, 281, 310, 333, 413, 222/255, 270, 273
See application file for complete search history.

(56) References Cited

U.S. PATENT DOCUMENTS

| | | | | |
|---|---|---|---|---|
| 3,122,272 | A * | 2/1964 | Marsh | 222/26 |
| 3,878,907 | A | 4/1975 | Morick | |
| 4,443,109 | A * | 4/1984 | Watts | 366/134 |
| 4,581,704 | A | 4/1986 | Mitsukawa | |
| 4,867,258 | A | 9/1989 | Narukawa et al. | |
| 4,913,198 | A | 4/1990 | Hayahara et al. | |
| 4,959,947 | A | 10/1990 | Reif | |
| 5,006,995 | A | 4/1991 | Toschi et al. | |
| 5,031,781 | A | 7/1991 | Price et al. | |
| 5,083,591 | A | 1/1992 | Edwards et al. | |
| 5,163,010 | A | 11/1992 | Klein et al. | |
| 5,163,484 | A | 11/1992 | Howlett et al. | |
| 5,203,387 | A | 4/1993 | Howlett et al. | |
| 5,268,849 | A | 12/1993 | Howlett et al. | |
| 5,328,057 | A | 7/1994 | Hellenberg et al. | |
| 5,348,188 | A | 9/1994 | Bohler | |
| 5,365,722 | A | 11/1994 | Edwards et al. | |
| 5,390,714 | A | 2/1995 | North, III et al. | |
| 5,474,211 | A * | 12/1995 | Hellenberg | 222/1 |
| 5,542,572 | A | 8/1996 | Davis | |
| 5,622,692 | A | 4/1997 | Rigg et al. | |
| 5,632,314 | A | 5/1997 | Koppe et al. | |
| 5,647,411 | A | 7/1997 | Koppe et al. | |
| 5,690,252 | A | 11/1997 | Oleksiewicz et al. | |
| 5,697,527 | A | 12/1997 | Altieri, Jr. et al. | |

(Continued)

FOREIGN PATENT DOCUMENTS

DE 19728624 1/1998

(Continued)

OTHER PUBLICATIONS

International Search Report dated Feb. 16, 2005.

*Primary Examiner*—Joseph A. Kaufman
(74) *Attorney, Agent, or Firm*—Miller Matthias & Hull

(57) ABSTRACT

An apparatus for dispensing a plurality of powders or flowable materials, such as colorants for paint, caulking or grout or components of cosmetics, comprising a plurality of containers for holding the powders or flowable materials, a plurality of metering pumps, connected to a container or having a connector for releasably connecting a container to the respective pump, wherein the capacity of the metering pump is selectable.

18 Claims, 2 Drawing Sheets

U.S. PATENT DOCUMENTS

| | | | |
|---|---|---|---|
| 5,711,458 A | 1/1998 | Langeveld et al. | |
| 5,785,960 A | 7/1998 | Rigg et al. | |
| D401,246 S | 11/1998 | Langeveld et al. | |
| 5,903,465 A | 5/1999 | Brown | |
| 5,911,342 A * | 6/1999 | Sindoni | 222/144.5 |
| 5,938,030 A | 8/1999 | Stolz | |
| 5,945,112 A | 8/1999 | Flynn et al. | |
| 5,992,691 A | 11/1999 | Post et al. | |
| 6,003,731 A | 12/1999 | Post et al. | |
| 6,089,538 A | 7/2000 | Shirkhan | |
| 6,168,305 B1 * | 1/2001 | Marmsater | 700/240 |
| 6,193,053 B1 | 2/2001 | Gaalswyk | |
| 6,221,145 B1 | 4/2001 | McClain | |
| 6,273,298 B1 | 8/2001 | Post et al. | |
| 6,398,513 B1 | 6/2002 | Amsler et al. | |
| 6,412,658 B1 | 7/2002 | Bartholomew et al. | |
| D461,080 S | 8/2002 | Bartholomew et al. | |
| D465,810 S | 11/2002 | Bartholomew et al. | |
| 6,510,366 B1 | 1/2003 | Murray et al. | |
| D472,253 S | 3/2003 | Reedy et al. | |
| 6,540,486 B1 | 4/2003 | Amsler et al. | |
| 6,615,881 B1 | 9/2003 | Bartholomew et al. | |
| 6,622,064 B1 | 9/2003 | Bartholomew et al. | |
| D485,310 S | 1/2004 | Bartholomew et al. | |
| 6,672,341 B1 | 1/2004 | Bartholomew et al. | |
| 2001/0047309 A1 | 11/2001 | Bartholomew et al. | |
| 2002/0010528 A1 | 1/2002 | Bartholomew et al. | |
| 2003/0019885 A1 | 1/2003 | Luehrsen et al. | |
| 2003/0060925 A1 | 3/2003 | Bartholomew et al. | |
| 2003/0062379 A1 | 4/2003 | Bartholomew et al. | |
| 2003/0090176 A1 | 5/2003 | Bartholomew et al. | |
| 2003/0230355 A1 | 12/2003 | Bartholomew et al. | |

FOREIGN PATENT DOCUMENTS

| | | | |
|---|---|---|---|
| DE | 29924013 | U | 9/2001 |
| EP | 0283137 | A1 | 9/1988 |
| EP | 0391286 | | 10/1990 |
| EP | 0642464 | A4 | 6/1995 |
| EP | 0642464 | B1 | 10/1997 |
| EP | 0947699 | A1 | 10/1999 |
| EP | 0992450 | A1 | 4/2000 |
| EP | 1090679 | A1 | 4/2001 |
| EP | 08-00858 | B1 | 7/2002 |
| EP | 1275433 | A1 | 1/2003 |
| EP | 1134186 | B1 | 5/2003 |
| EP | 1361185 | | 11/2003 |
| EP | 1388365 | | 2/2004 |
| EP | 1559652 | A1 | 8/2005 |
| FR | 2106944 | | 5/1972 |
| FR | 2582912 | | 12/1986 |
| GB | 1433710 | | 4/1976 |
| GB | 1548965 | | 7/1979 |
| GB | 2151362 | | 7/1985 |
| JP | 60183028 | | 9/1985 |
| WO | WO-94/21554 | | 9/1994 |
| WO | WO-01-75586 | A1 | 10/2001 |
| WO | WO-02/073142 | | 9/2002 |
| WO | WO-03-026458 | A2 | 4/2003 |
| WO | WO-03/031161 | A1 | 4/2003 |
| WO | WO-03/031280 | A1 | 4/2003 |
| WO | WO-03/045542 | | 6/2003 |
| WO | WO-03/083334 | A1 | 10/2003 |
| WO | WO-03/084653 | | 10/2003 |

* cited by examiner

APPARATUS FOR DISPENSING A PLURALITY OF POWDERS AND METHOD OF COMPOUNDING SUBSTANCES

BACKGROUND

1. Technical Field

An apparatus for dispensing a plurality of flowable materials, such as colorants for paint, dye, caulking or grout or components of cosmetics, and to a method of compounding flowable substances are disclosed.

2. Background of the Related Art

A prior art apparatus of this type is disclosed in U.S. patent application 2003/0230355. This document pertains to an interactive cosmetic body powder selection system having a point of sale dispenser. The system includes a cosmetic powder dispenser that contains a plurality of different shades, tints or hues of colors or pigments, which can be dispensed in pre-selected proportions to create a custom color selection. A user-interactive system is provided at a point-of-sale for allowing a user to choose or dispense a color, effect, or both. Information about the selection is employed for dispensing the appropriate proportions of ingredients. Preferably the ingredients are dispensed manually into a powder canister having an integrated brush in fluid communication with the canister. In another embodiment, the system is automated.

U.S. Pat. No.4,959,947 relates to an apparatus for the production and packaging of a compound mixture, in which extremely accurate and rapid weighing-out, proportioning and packaging of individual components are achieved, is provided. For this, filling stations (4 to 6) are equipped with combined discharge, weighing and transfer devices (22), which allow single-component treatment. In colunm 4, lines 25 to 32 it is stated that "The first type of filling station 4 (individual vessels 1 to 4) illustrated in FIG. 1 has a discharge device 23 which is composed of two electronically controlled worm conveyors 24 arranged above one another and of an electronically controlled shutoff valve 25. The double worm conveyor serves for matching the proportioning capacity to the material to be conveyed or to the amount to be weighed out from the feed vessel 7."

German Utility Model 299 24 013 relates to a metering device for a powder, such as aluminum powder for making cellular concrete, which comprises a relatively large screw for generating a relatively large mass flow and a relatively small screw, which receives material from the relatively large screw.

An apparatus for and method of relatively accurately and relatively quickly dispensing different amounts of flowable materials such as powders, slurries and liquids are disclosed.

In an embodiment, the said amounts vary over a wide range.

The disclosed apparatus is of a relatively robust construction.

SUMMARY OF THE DISCLOSURE

An apparatus for dispensing a plurality of powders and other flowable materials, such as colorants for paint, caulking or grout or components of cosmetics, comprising a plurality of containers for holding the powders, a plurality of metering pumps, connected to a container or having a connector for releasably connecting a container to the respective pump, wherein the capacity of the metering pump, i.e. the amount dispensed at each revolution (in case of screw pumps) or nominal stroke (in case of a piston pumps) is selectable.

By employing metering pumps of which the capacity is selectable, the time needed for dispensing a particular amount of flowable material can be reduced and/or the accuracy with which this amount is dispensed can be increased. In other words, it becomes possible to optimize for speed on the one hand and accuracy on the other.

A selectable capacity can be achieved in various ways. E.g. by providing a screw pump, which can be tilted so as to lower the outlet opening and thus stimulate the flow of the material, or by providing a screw pump, wherein the screw comprises a helical wire or spring wound about a rod and wherein the effective pitch of the screw and thus the capacity can be increased respectively decreased by elongating respectively shortening the helical wire or spring. It is also possible to employ a conical screw housed in a (horizontal) conical chamber, with the outlet opening at the apex of the conical chamber. By moving the screw, in axial direction, away from or towards the outlet opening, the capacity of the pump can be respectively increased or decreased.

However, it is preferred that the metering pumps may comprise two, preferably separated pump mechanisms, one mechanism having a relatively large dispensing capacity and another mechanism having a relatively small dispensing capacity. With such pumps, the amounts to be dispensed may vary over a wide range.

It is further preferred that the disclosed apparatus comprises at least one weighing device for weighing at least one, preferably all of the dispensed amounts.

A disclosed method of compounding substances, such as paints, dyes, caulking or grout or cosmetics, comprises providing apparatus comprising a plurality of containers holding powders, a plurality of pumps, dispensing an amount of powder into a receptacle by means of at least one of the metering pumps and selecting the capacity of this metering powder pump prior to or during the dispensing of that amount.

It is preferred that at least some, preferably all of the metering pumps comprise at least two pump mechanisms and that the method further comprises dispensing a relatively large part of the said amount by means of one mechanism and dispensing a relatively small part of the said amount by means of another mechanism.

Optimization of speed and/or accuracy is further facilitated if the said large part is at least ten times larger than the said small part.

The disclosed method is especially suitable for compounding substances at a point-of-sale or, in case of paint, at a paint shop.

Within the framework of the invention, the term "powder" is defined as particles having a size in a range from 0 to 1500 μm, preferably in a range from 10 to 500 μm, and at least includes granulates, microgranulates, crystals, frit, grounds, microspheres and the like.

It is noted that the drawings are not necessarily to scale and that details, which are not necessary for understanding the present invention, may have been omitted. The terms "upper", "lower", "horizontal", "vertical", "front", "rear", and the like relate to the embodiments as oriented in the figures. Further, elements that are at least substantially identical or that perform an at least substantially identical function are denoted by the same numeral.

DETAILED DESCRIPTION OF THE PRESENTLY PREFERRED EMBODIMENTS

Figure 1:
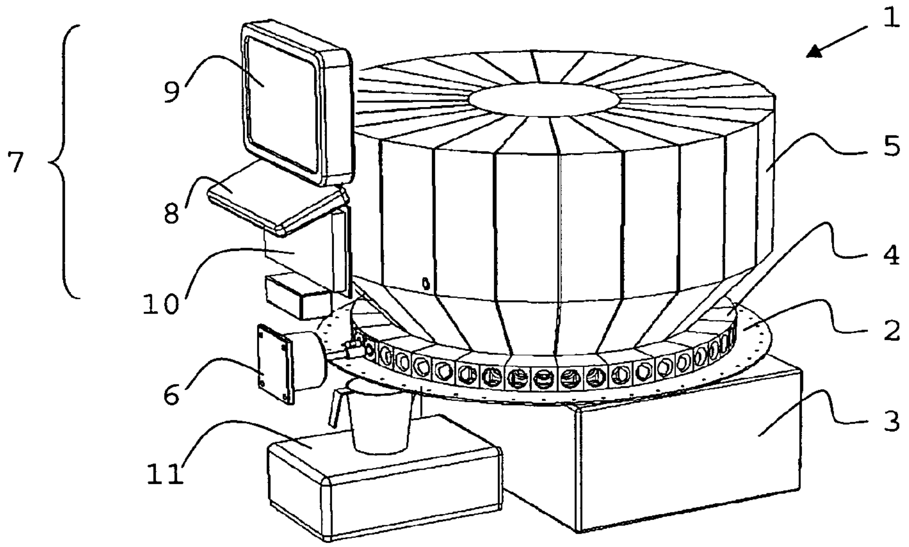
FIG. 1 is a perspective view of a disclosed apparatus for dispensing powders and other flowable materials.
Figure 2:
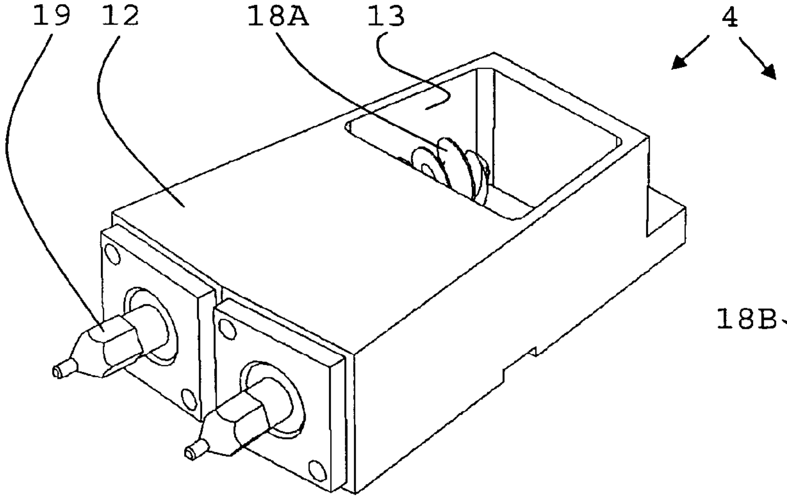
FIG. 2 is a perspective top view of a metering pump used in the apparatus of FIG. 1.

FIGS. 1 and 2 illustrate an example of an apparatus 1 for dispensing a plurality of powders or other flowable materials, such as pigments for compounding paints, dyes, caulking or grout or components of cosmetics, e.g. foundations. It can be used for numerous paint or cosmetic recipes and can be located e.g. at a retailer, a spa or at a body repair shop for cars.

This particular dispensing apparatus 1 is an automated version and includes a horizontal turntable 2, mounted on a support 3 and carrying, along its circumference, a plurality of metering pumps 4 and twenty-four containers 5 for the powders or flexible materials. The turntable 2 can be rotated about a vertical, central axis by means of a motor inside the support 3 and between discrete positions, in this case forty-eight positions (two for each container as will become apparent below) including a front or dispensing position provided with a stepper motor 6 for driving one of the pumps 4.

The apparatus 1 further comprises a control device 7 comprising a small keyboard 8 for entering information, such as client data and paint recipes, and a display 9. The control device 7 also comprises a computer 10 for storing the said information and for driving the turntable 2 and the stepper motor 6.

A weighing device 11, comprising an upper plate (shown in FIG. 1) on which a cup or other receptacle can be placed and a load-cell (hidden from view and known in itself), is located beneath the pump 4 and the container 5 that are in the dispensing position. Optionally, a dispenser (not shown) for cups or other receptacles can be provided, especially when the apparatus 1 is being employed for dispensing components of cosmetics.

Figure 3:
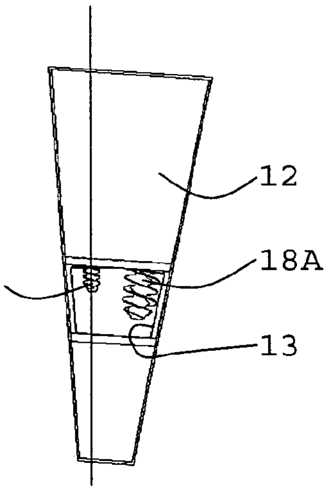
FIG. 3 is a further top view of the said metering pump.

As can be seen in FIGS. 2 and 3, each of the metering pumps 4 comprises a housing 12 having a inlet chamber 13, with an inlet opening facing upwards and positioned beneath a container 5, and a polycylindrical bore (shown in cross-section in FIGS. 4 and 5) leading to an outlet chamber 14 facing downwards and, during dispensing, positioned over a receptacle 15. A lid 16 is pivotably mounted on the housing 11 for closing the outlet chamber 14.

Inserts 17 are mounted, e.g. by means of an external screw thread, in the said channel. These inserts 17 are provided with axially extending pump chambers, which accommodate two concave profile screws 18 of different size and which can be readily replaced, e.g. when a different type or size of screw is to be fitted.

In this example, the screws 18 extend radially with respect to the turntable 2. The relatively large screw 18A has a diameter of 22 mm and a double pitch of 12 mm, yielding a dispensed volume for each revolution of 735 $mm^3$, whereas the relatively small screw 18B has a diameter of 8.5 mm and a double pitch of 7 mm, yielding a dispensed volume for each revolution of 35 $mm^3$. First ends of the screws 18, extending away from the central vertical axis of the turntable 2, are each provided with an adaptor 19 which is to be engaged by the stepper motor 6, as will be explained in more detail below. Further, each of the screws 18 is made of polypropylene (PP) or Teflon™ (PTFE) reinforced with a cylindrical metal rod 20.

In order to further improve the dispensing accuracy of the screws 18, the effective outer diameter of the screws 18 is in excess of the effective inner diameter the respective chamber. The rim of the screw is at least partially bent in the displacement direction of the pump. Such bending can be achieved by simply inserting the oversized screws in the channels from the outlet side towards in the inlet side.

In an alternative embodiment, which is especially suitable for fragile powders, the effective outer diameter of the screw is smaller than the effective inner diameter of the respective chamber, resulting in clearance between the screw and the chamber, and wherein the screw is provided with bristles that bridge this clearance. This type of screw was found to be effective in reducing the forces exerted on the powder.

Figure 4:
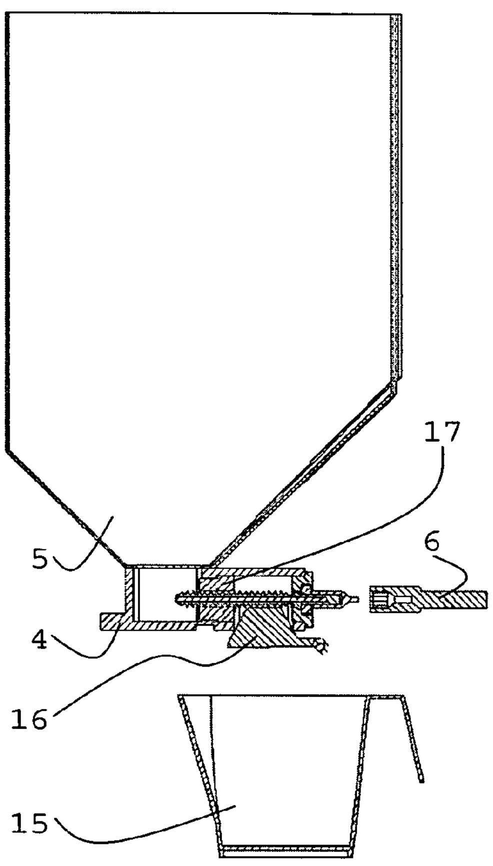
FIGS. 4 and 5 are cross-sectional side views of a container and metering pump used in the apparatus of FIG. 1.
Figure 5:
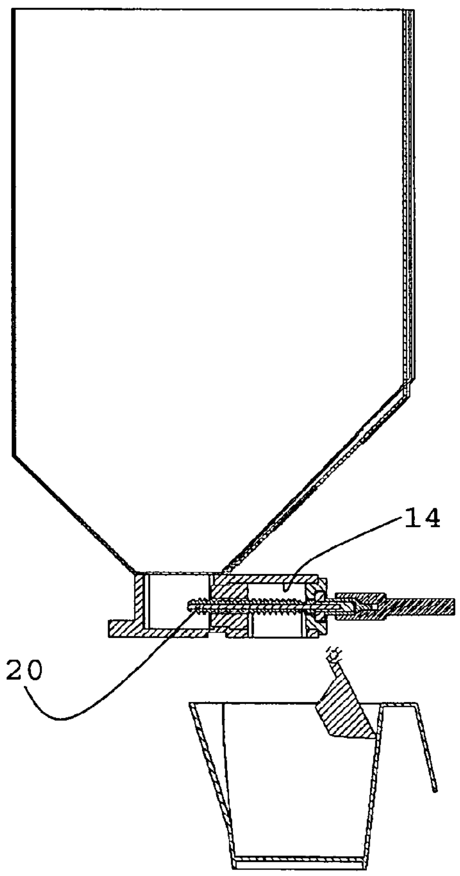

As illustrated in FIGS. 4 and 5, during the dispensing of a particular recipe, e.g. consisting just of powders or other flowable materials to be dispensed and mixed in a cup or consisting of a base material into which one or more powders or materials should be dispensed, the turntable 2 is rotated about its vertical axis until the container 5 with the required powder is in the dispensing position. Subsequently, the lid 16 is opened and, depending on the amount to be dispensed, the large screw 18A, which a particular powder having a density of, say, 0.57 $g/cm^3$ dispenses 0.42 g for each revolution, or the small screw 18B, which dispenses 20mg for each revolution, is selected. E.g. if 84.36 g is to be dispensed, the large screw 18A is positioned in front of the stepper motor 6, engaged by the same, and driven to completed 200 turns. Subsequently, the small screw 18B is positioned in front of the stepper motor 6, engaged by the same, and driven to complete 18 turns, yielding the required amount.

In another example, employing the weighing device 11, if the screws have an accuracy of 2%, 96% of the required amount is dispensed by the large screw 18A and the dispensed amount is verified by the weighing device 11. If it is established that e.g. 97% of the required amount has been dispensed, the large screw 18A is driven to dispense a total of 99% and the remaining part is dispensed by means of the small screw 18B.

The accuracy of the screws can be further enhanced by calibrating, relative to a reference or zero position of the screw, the dispensed amounted in several positions within one revolution, e.g. for each step of 30 degrees yielding a total of 12 steps in one revolution. By calibrating for several positions, any non-linear effects can be taken into account. These effects dependent inter alia on the dimensions and material of the screw and on the powder that is being dispensed. In some cases, the screw will dispense relatively small amounts or not dispense at all during e.g. two or three steps and then dispense a relatively large amount in the fourth step, which phenomenon could be referred to as "pulsing". Many of these effects were found to be sufficiently regular to allow compensation by calibration.

In addition to use during dispensing, the above-described weighing device 11 can also be used to calibrate one or more of the pumps.

Once dispensing of a particular material has been completed, the lid 16 is closed and the turntable 2 is rotated until the next required container 5 is in the dispensing position. Closing the lid 16 prevents material from falling out during rotation. In an alternative embodiment, the screws that have just been used are revolved in reverse direction prior to rotation of the turntable thus drawing the material back into the metering pump.

With the above described apparatus and method dispensing it is possible to relatively accurately and quickly dispense amounts ranging from e.g. 10 mg to 500 g.

As a matter of course, this disclosure is not restricted to the above-disclosed embodiments, which may be varied and still fall within the spirit and scope of this disclosure. For example, the disclosed apparatus can be configured as a linear dispensing apparatus i.e. with the containers aligned is a row. Also, as indicated above, the apparatus may also comprise at least one container for a liquid or other flowable materials and a metering liquid pump connected to that container.

What is claimed is:

1. An apparatus for dispensing a plurality of flowable materials comprising:

a plurality of containers for holding the materials, a plurality of pumps, connected to a container or having a connector for releasably connecting a container to the respective pump, wherein the capacity of the pump is selectable and at least some of the pumps comprise at least two pump screws, one screw having a relatively large dispensing capacity and the other screw having a relatively small dispensing capacity.

2. The apparatus of claim 1, wherein an effective outer diameter of the screw is in excess of an effective inner diameter a respective chamber in which said screw is accommodated and, wherein an outer edge of the screw is at least partially bent in the displacement direction of the pump.

3. The apparatus of to claim 1, wherein an effective outer diameter of the screw is smaller than an effective inner diameter of a respective chamber in which said screw is accommodated, resulting in clearance between the screw and the chamber in which said screw is accommodated, and wherein at least some of the screws comprise an axial core and radial bristles that bridge this clearance.

4. The apparatus of claim 1, which comprises a dispensing position common to all pumps and wherein a driver for engaging the pump mechanisms is located at the dispensing position.

5. The apparatus of claim 4, wherein the driver comprises a stepper motor.

6. The apparatus of claim 1, which is arranged to dispensing any amount in a range from 10 mg to 500 g.

7. The apparatus according to claim 1, comprising at least one weighing device for weighing at least one of the dispensed amounts.

8. The apparatus according to claim 1, which further comprises at least one container for a liquid and a metering liquid pump connected to that container.

9. The apparatus according to claim 1, wherein the screw or screws are made of PP or PTFE.

10. A method of compounding substances comprising:

providing an apparatus comprising a plurality of containers holding flowable materials, a plurality of metering pumps including at least one metering pump coupled to each container, each metering pump being driven by a stepper motor, at least some of the metering pumps comprising a large screw mechanism and a small screw mechanism, selecting a predetermined desired first amount of a first flowable material to be dispensed that is contained in a first container that is coupled to a first metering pump, dispensing an amount of the first material into a receptacle by means of the large screw mechanism of the first metering pump, weighing the dispensed amount, comparing the dispensed amount with the predetermined desired first amount, using a difference between the dispensed amount and the predetermined desired first amount to calculate a new amount to be dispensed and operating to dispense the new amount using the small screw mechanism of the first pump.

11. The method of claim 10 wherein the said large screw mechanism is at least ten times larger than the small screw mechanism.

12. The method of claim 10, wherein at least one material is dispensed in a base material.

13. The method of claim 10, wherein the substances are compounded at a point-of-sale.

14. The apparatus of claim 7, wherein the weighing device and metering pumps are linked to a controller and wherein each time a particular pump dispenses an amount, the weighing device weighs the dispensed amount and the controller compares the dispensed amount with a predetermined desired amount and uses any difference between the dispensed and desired amounts to modify a number of steps of the stepper motor during future dispenses.

15. A method of dispensing a plurality of flowable cosmetics ingredients utilizing individually controlled dispense pumps drawing flowable material from separate containers, the pumps positioned to dispense to a common receptacle with a weighing device associated with the receptacle and a computer controlling operation of the pumps, each pump comprising a large screw mechanism and a small screw mechanism, the method comprising:

operating the large screw mechanism of a selected pump in a controlled manner to move a predetermined assumed amount of a chosen flowable material less than a desired complete dispense amount of said material to said receptacle in accordance with a program stored on said computer which relates a parameter of the large screw mechanism operation to the predetermined assumed amount of flowable material, weighing an amount actually dispensed to said receptacle and determining an actual amount dispensed, comparing the actual amount dispensed to the predetermined assumed amount and determining a difference between the actual amount dispensed and the predetermined assumed amount to provide a first deviation determination between the predetermined assumed amount and actual dispensed amount for the selected pump, operating the small screw mechanism of a selected pump in a controlled manner to move the difference of the chosen flowable material to said receptacle.

16. The method of claim 15 wherein the parameter is a number of steps carried out by the stepper motor to dispense a unit weight of flowable material by the large screw mechanism from the selected pump.

17. A method of compounding substances comprising:

providing an apparatus comprising a plurality of containers holding flowable materials, and a plurality of metering pumps, each metering pump being linked to two orifices of different sizes including a large orifice and a small orifice, dispensing an amount of one of the materials into a receptacle by means of at least one of the metering pumps through the large orifice, weighing the dispensed amount, comparing the dispensed amount with predetermined desired amount, using a difference between the dispensed amount and the desired amount to calculate new amount to be dispensed and operating to dispense the new amount through the small orifice.

18. The method of claim 17 wherein each pump comprises two pump elements including a small pump element and a large pump element with the small orifice accommodating the small pump element and the large orifice accommodating the large pump element.

* * * * *